United States Patent [19]
Allen

[11] Patent Number: 5,621,270
[45] Date of Patent: Apr. 15, 1997

[54] ELECTRON WINDOW FOR TOXIC REMEDIATION DEVICE WITH A SUPPORT GRID HAVING DIVERGING ANGLE HOLES

[75] Inventor: Curtis G. Allen, Hayward, Calif.

[73] Assignee: Litton Systems, Inc., Woodland Hills, Calif.

[21] Appl. No.: 408,474

[22] Filed: Mar. 22, 1995

[51] Int. Cl.[6] .................................................. H01J 33/04
[52] U.S. Cl. ..................... 313/420; 315/5.33; 250/492.3; 250/505.1
[58] Field of Search ................................ 315/5.33, 5.34, 315/344, 382; 250/492.3, 505.1; 313/420

[56] References Cited

U.S. PATENT DOCUMENTS

| | | | |
|---|---|---|---|
| 1,907,507 | 5/1933 | Coolidge | 313/420 |
| 4,091,306 | 5/1978 | Hant | 313/420 |
| 4,333,036 | 6/1982 | Farrell | 313/420 |
| 5,319,211 | 6/1994 | Matthews et al. | 250/492.3 |
| 5,479,469 | 12/1995 | Fraser et al. | 250/505.1 X |
| 5,489,783 | 2/1996 | Kristiansson | 313/420 X |

FOREIGN PATENT DOCUMENTS 0138588  11/1979  Germany .................... 313/420

*Primary Examiner*—Benny Lee
*Assistant Examiner*—Justin P. Bettendorf
*Attorney, Agent, or Firm*—Graham & James LLP

[57] ABSTRACT

An improved electron window is provided for use with a diverging electron beam for use in remediation of hazardous volatile organic compounds. The electron window comprises a support grid having a plurality of circular holes disposed in a diverging bolt circle pattern. Individual electrons of the diverging electron beam pass through respective ones of the plurality of holes. A barrier is provided on a downstream side of the support grid so that the individual electrons pass through the barrier. The circular holes are each of substantially uniform diameter. The diverging bolt circle pattern further comprises a single one of the holes substantially centered on the support grid, and a plurality of groups of the holes concentrically disposed around the single one of the holes. Each of the groups of the holes is disposed in a circular pattern. A number of the holes defined within successive ones of the plurality of groups of holes increases arithmetically as an associated diameter of the circular patterns increases. Also, an associated angle of the holes defined within successive ones of the plurality of groups of holes increases as an associated diameter of the circular patterns increases. The diverging electrons are transmitted through the support grid at a maximum rate of efficiency without undesired interception with the surfaces of the grid holes.

20 Claims, 4 Drawing Sheets

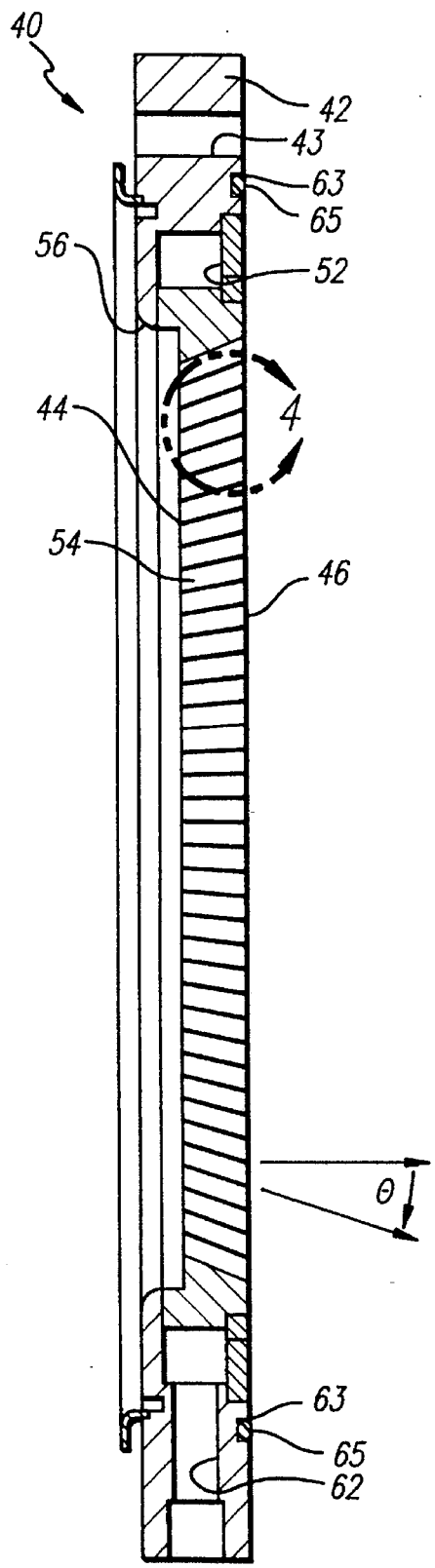
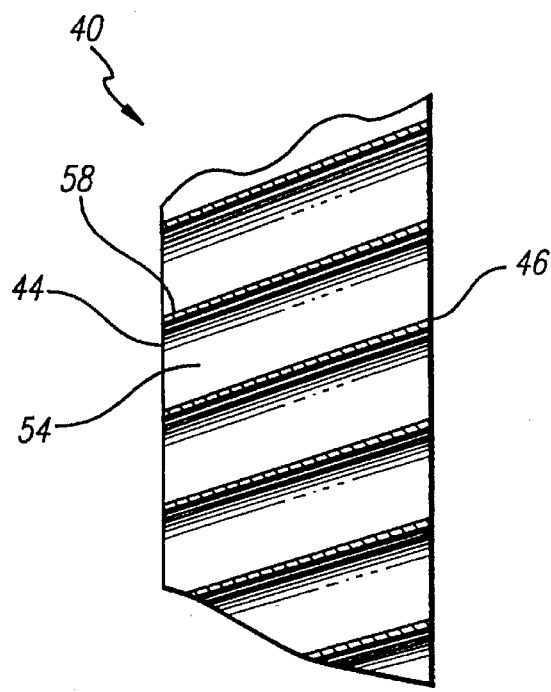
FIG. 3
FIG. 4

ELECTRON WINDOW FOR TOXIC REMEDIATION DEVICE WITH A SUPPORT GRID HAVING DIVERGING ANGLE HOLES

RELATED APPLICATION

This invention relates to copending application Ser. No. 08/408,474, filed on the same date herewith, entitled DIVERGING BEAM ELECTRON GUN FOR TOXIC REMEDIATION DEVICE with a DOME-SHAPED FOCUSING ELECTRODE, owned by the assignee of this application.

BACKGROUND OF THE INVENTION

1. Field of the Invention

The present invention relates to the use of a high energy electron beam to chemically transform or destroy certain types of hazardous waste, and more particularly, to an electron window that promotes efficient transfer of a diverging high energy electron beam into a detoxification vessel.

2. Description of Related Art

Volatile organic compounds (VOCs) exist in the form of vapors or gasses that are emitted or vaporized from hazardous or toxic waste materials. Since these VOCs pose a significant health risk to individuals and to the environment, it is necessary to contain, extract and collect the hazardous materials so as to prevent spreading of the VOCs into the air and/or ground water. Once contained, the VOCs can be remediated by converting them into less hazardous materials that can be disposed of with substantially reduced risk.

One such remediation technique involves the injection of a high energy electron beam into a detoxification vessel containing the VOCs. Interaction between the electrons of the beam and the VOCs causes chemical transformation of the VOCs in three significant aspects, including: (1) direct de-chlorination resulting in inorganic chloride ions and reactive organic intermediates which are further degraded into non-reactive compounds; (2) production of organic and inorganic free radicals and ions which are reactive and whose reactions result in destruction of the target hazardous materials; and (3) formation of aqueous electrons (in the presence of water vapor) capable of reducing chemical bonds. An example of a toxic remediation device comprising an electron beam source coupled to a detoxification vessel is disclosed in U.S. Pat. No. 5,319,211.

In order to achieve a sufficient level of remediation within the detoxification vessel, it is desirable to provide an electron beam having relatively high energy (in excess of −160 kilovolts DC). Diverging electron beams are generally desirable since they tend to distribute the energy of the beam evenly across a wide region of the vessel. The electron beam source operates in a vacuum environment, and the diverging electrons of the beam must pass through an electron window that provides a barrier with the non-vacuum environment of the detoxification vessel. The electron window typically comprises a support grid having a plurality of holes extending therethrough, with a sheet of metal foil disposed on a downstream side of the support grid. Ideally, the electrons pass through the holes and the foil with minimal interception by the support grid itself, since such interceptions result in undesirable energy loss to the support grid.

In practice, however, it is difficult to efficiently transmit the diverging electrons of the beam through the electron window into the vessel. The holes of the support grid must be large enough to accommodate the diverging path of the electrons, but when the holes in the support grid are too large, the temperature differential ($\Delta T$) within the foil between the center of the hole and the edge of the hole becomes too high, and the foil loses structural and thermal integrity. Similarly, as the holes represent an increased percentage of the surface area of the support grid, the support grid becomes less able to withstand the force created by the vacuum pressure used to evacuate the electron beam source structure during its assembly. This vacuum force imposes significant mechanical stress on the support grid, and in some cases may cause deformation or bowing of the support structure. Such deformation further reduces the effective hole size relative to the diverging electron paths, thereby reducing electron transmission. At the same time, the thermal conduction path through the support grid decreases and therefore the $\Delta T$ in the support grid increases.

The temperature of the metal foil at the center of each hole equals the coolant temperature plus the $\Delta T$ of the support grid plus the $\Delta T$ in the foil, measured from the edge of the hole to the center of the hole. Titanium is a desirable material for the metal foil, due to its high strength, low atomic number for electron transmission (i.e., good electron transmissivity), high melting point, and high vacuum compatibility. It is necessary, however, to keep the foil temperature below 400° C., otherwise the titanium foil transforms from an e crystalline form to a β crystalline form. The β form of titanium is more susceptible to oxidation, which leads to embrittlement and a higher likelihood of rupture (i.e., loss of vacuum within the electron beam source structure). This problem may be further exacerbated by the high operating voltage of the device, since the high current density ($W/cm^2$) through a large hole size may result in destructively high $\Delta T$ levels in the foil.

Thus, a critical need exists for an efficient electron window to provide a vacuum barrier between a high power electron beam source and an associated detoxification vessel for remediation of VOCs from hazardous or toxic waste. Such an electron window should be able to efficiently conduct a diverging electron beam into the vessel without compromising either its thermal or structural capability.

SUMMARY OF THE INVENTION

In accordance with the teachings of this invention, an improved electron window is provided that allows for the efficient transmission of a diverging electron beam into a detoxification vessel for use in remediation of hazardous volatile organic compounds. The electron window comprises a support grid spaced from a source of the electron beam and having a plurality of holes disposed in a diverging bolt circle pattern. Individual electrons of the diverging electron beam pass through respective ones of the plurality of holes. A barrier is provided on a downstream side of the support grid to form a vacuum seal between the electron beam source and the detoxification vessel. The individual electrons pass through the barrier with minimal thermal loss to the electron window.

Particularly, the holes are each of substantially uniform size. The diverging bolt circle pattern further comprises a single one of the holes substantially centered on the support grid, and a plurality of groups of the holes concentrically disposed around the single one of the holes. Each of the groups of the holes is disposed in a circular pattern. A number of the holes defined within successive ones of the plurality of groups of holes increases arithmetically as an associated diameter of the circular patterns increases. Also, an associated angle of the holes defined within successive ones of the plurality of groups of holes increases as an associated diameter of the circular patterns increases. Accordingly, the diverging electrons are transmitted through the support grid at a maximum rate of efficiency without undesired interception with the surfaces of the grid holes.

A more complete understanding of the electron window will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3 is an enlarged cross-sectional side view of the support grid, as taken through the section 3—3 of FIG. 2;

FIG. 4 is an enlarged portion of the support grid, as taken from FIG. 3;

DETAILED DESCRIPTION OF THE PREFERRED EMBODIMENT

The present invention satisfies the critical need for an efficient electron window for use between a high power electron beam source and an associated detoxification vessel for remediation of VOCs from hazardous or toxic waste. The electron window efficiently conducts the diverging electron beam into the vessel while maintaining sufficient thermal and structural integrity. In the detailed description which follows, like element numerals are used to describe like elements in each of the various figures.

Figure 1:
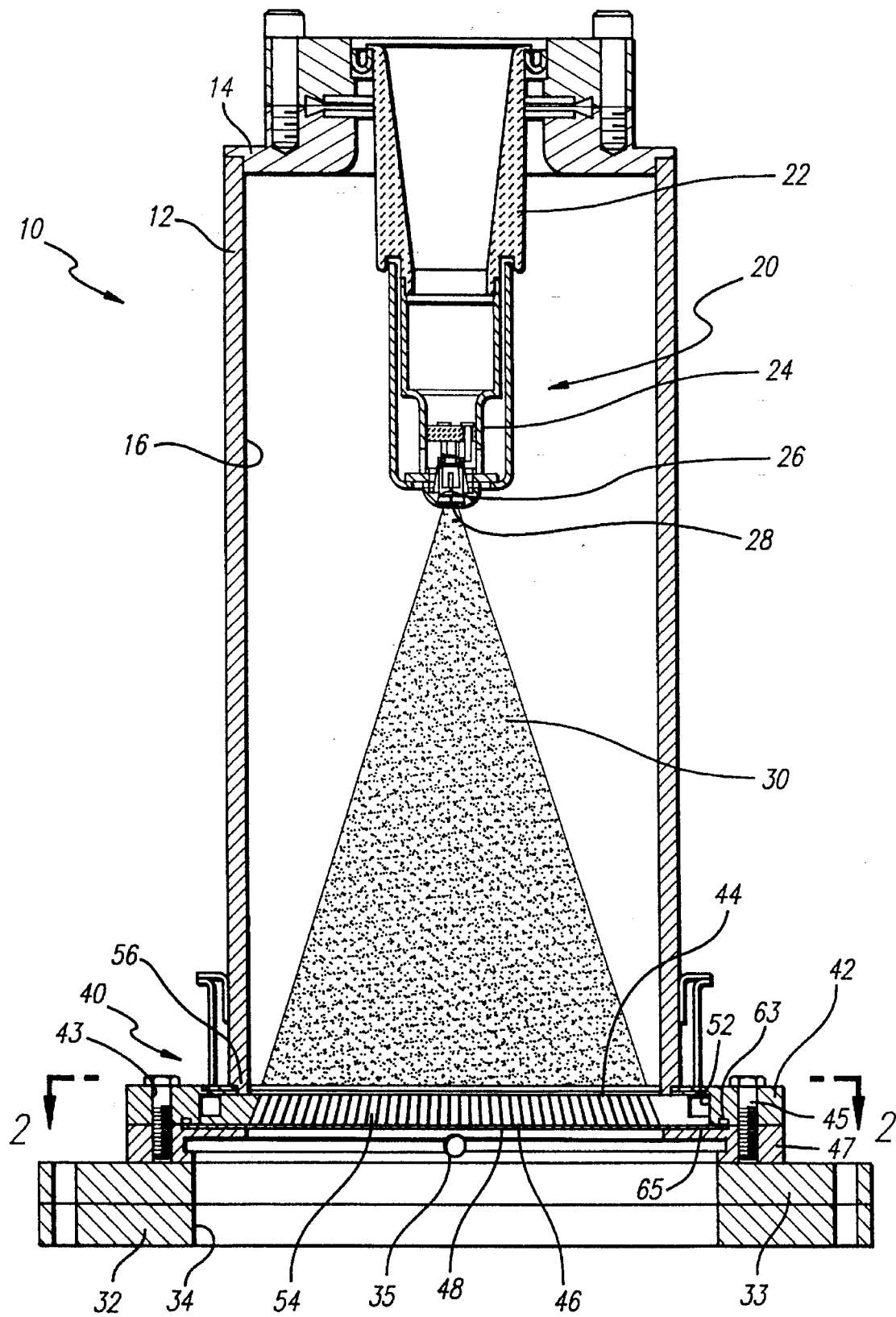
FIG. 1 is a cross-sectional side view of a diverging electron beam source of the present invention.

Referring first to FIG. 1, an evacuated electron beam source 10 is illustrated. The beam source 10 is contained within a generally cylindrical-shaped housing 12 that is enclosed at a first end by a plate 14. An interior surface 16 of the housing 12 defines a chamber in which a diverging electron beam 30 is formed. It should be apparent that the housing 12 could comprise other shapes besides cylindrical. For example, a conical shape could be advantageously utilized that may possibly contribute to shaping the electron beam into the desired diverging pattern; however, a conical-shaped housing may be more costly to construct and be more susceptible to high voltage breakdown.

The diverging electron beam 30 comprises a flow of individual electrons, each respectively following a path which diverges from each other due to the optical characteristics of the beam source 10. Individual electrons at a central portion of the electron beam 30 travel in a path that is generally coincident with a central axis of the housing 12, while individual electrons at a peripheral portion of the electron beam travel in respective paths having a maximum divergent angle relative to the central axis.

In the embodiment of FIG. 1, the diverging electron beam 30 is generated by a thermionic dispenser-type electron gun 20. The exemplary electron gun 20 comprises a support structure 22 that extends perpendicularly from the plate 14 along a central axis of the cylindrical housing 12. A cathode 26 is suspended at the end of a sleeve 24 that extends axially from the support structure 22. The cathode 26 has an emitting surface 28 which comprises an electron emissive material, impregnation or coating. The emitting surface 28 thermionically emits a stream of electrons which are drawn from the emitting surface by a high voltage electrical potential defined between the emitting surface and a downstream element that provides an anode. The diverging shape of the electron beam 30 may be controlled by focusing electric or magnetic fields (not shown), as known in the art. It should be apparent that alternative electron emissive sources for the electron beam are possible, such as a tungsten or an oxide-coated filament or disk, and may further include one or more additional electrodes for focusing and/or accelerating the electron beam.

The diverging electron beam 30 is introduced into a detoxification vessel through an electron window, which provides a vacuum interface between the electron beam source 10 and the detoxification vessel. FIG. 1 illustrates a portion of the detoxification vessel 34 having an outer flange 32. The flange 32 permits mechanical coupling between a support grid 40 of the electron window and the detoxification vessel. The detoxification vessel has an open chamber (not shown) below the outer flange 32 into which the VOCs are introduced, and the electrons of the beam 30 interact with the VOCs within the chamber. The detoxification vessel may further include a secondary window 33 disposed between the support grid 40 and the outer flange 32. The secondary window 33 may include a barrier to further protect the materials of the support grid 40 from possible corrosive effects of the VOCs within the detoxification vessel. An air inlet line 35 may also be provided to introduce ambient air into the region defined between the support grid 40 and the barrier of the secondary window 33. The ambient air interacts with the electrons of the diverging electron beam to form ozone, which may further be utilized in the detoxification process.

Figure 2:
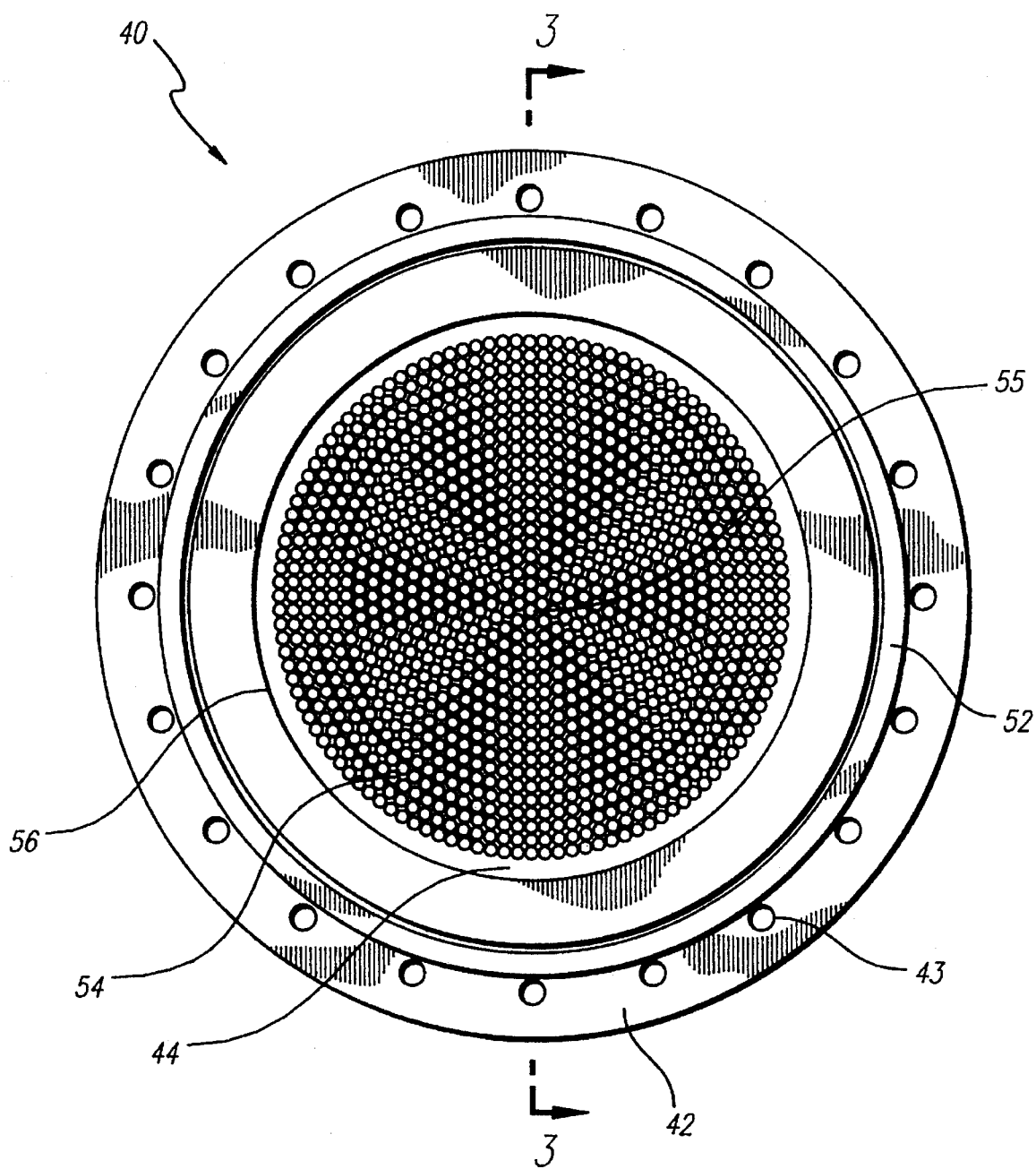
FIG. 2 is a cross-sectional end view of an electron window support grid of the present invention, as taken through the section 2—2 of FIG. 1.

The support grid 40 of FIG. 1 has an upstream surface 44, a downstream surface 46, an outer flange 42, and an internal coolant channel 52. Referring now to FIGS. 2 through 4, the support grid 40 is illustrated in greater detail. As shown in FIG. 2, the support grid 40 is circular-shaped with an outer flange 42. The flange 42 includes a plurality of bolt holes 43 disposed in a circular pattern. The bolt holes 43 permit the coupling of the support grid 40 to a support ring 47, such as by use of bolts 45 (shown in FIG. 1). The combined support grid 40 and support ring 47 are in turn coupled to the detoxification vessel.

A coolant channel 52 is disposed radially inward from the circular pattern of the bolt holes 43, and follows a circular path along a peripheral portion of the support grid 40. In FIG. 3, the coolant channel 52 is illustrated as having a rectangular cross-section with maximum surface area for efficient thermal conduction from the support grid 40 into a coolant fluid. A coolant inlet 62 provides coupling to the coolant channel 52 from an external coolant reservoir. An additional coolant outlet (not shown) is also provided for coupling between the coolant channel 52 and the external coolant reservoir, and is substantially equivalent to the coolant inlet 62.

The support grid 40 further comprises a rounded frame portion 56 that defines a radially outermost peripheral portion of the electron window within the chamber defined by the housing 12. As illustrated in FIG. 1, the end of the housing 12 opposite from the plate 14 couples to the support grid 40 at the frame portion 56. The frame portion 56 has a rounded rim (see FIG. 3) to provide for reflection of any stray electrons of the electron beam to the upstream surface 44, and also minimizes any undesirable electrical arcing at the support grid.

Typically, the support grid 40 is operated at ground potential, and provides the anode for acceleration of the electron beam from the cathode described above. Alternatively, the support grid 40 could be electrically coupled to ground, but isolated from the housing 12 of the device. Such an embodiment would promote electron beam impingement on the support grid 40 instead of interception on the housing 12.

A vacuum barrier 48 is provided at the downstream surface 46, illustrated in FIG. 1, and provides a vacuum seal for the electron beam source 10. The vacuum barrier 48 must be capable of maintaining the vacuum within the electron beam source 10, while allowing a sufficient portion of the electrons of the beam 30 to pass therethrough. Further, the vacuum barrier 48 must be able to conduct thermal energy to the structure of the support grid 40. The vacuum barrier 48 may be comprised of a metal foil, such as titanium or beryllium, of a thickness selected to provide sufficient strength with minimal energy loss from the electrons of the beam 30.

As illustrated in FIGS. 1 and 3, an O-ring 65 is disposed in a channel 63 defined in the downstream surface 46 of the support grid 40. The O-ring 65 compresses to seal the vacuum barrier 48 to the support grid 40 upon pressure applied by the bolting of the support ring 47 to the support grid 40 (shown in FIG. 1). The O-ring 65 may be comprised of metal to promote a solid bond with the foil vacuum barrier 48, and may also be plated with gold material to provide a more suitable bond interface. Alternatively, the vacuum barrier 48 may be brazed to the downstream surface 46 in order to seal the vacuum.

The region of the support grid 40 between the upstream surface 44 and downstream surface 46 is perforated by a plurality of holes 54 extending therethrough. Each of the holes 54 are circular and have a substantially uniform diameter. As shown in FIG. 4, the space between adjacent ones of the holes 54 provides a web 58 that maintains the structural integrity of the support grid 40 and allows thermal conduction through the support grid and vacuum barrier 48.

It should be apparent that coolant channels could also be provided which extend radially through the support grid 40, passing through the web 58 between adjacent ones of the electron transmitting holes 54. Such an approach would further reduce the $\Delta T$ within the support grid 40, but would also increase the cost and complexity of manufacturing the support grid. It is anticipated that the $\Delta T$ levels of the preferred embodiment of the present invention would be sufficiently low without the radially directed coolant channels, however, the additional channels may be required in embodiments of the present invention in which additional reductions in $\Delta T$ levels are necessary.

As illustrated in FIG. 2, the holes are disposed in a pattern referred to herein as a bolt circle pattern. The bolt circle pattern comprises a first hole 55 that is substantially centered within the pattern. A first group of holes disposed in a circular pattern, referred to as a bolt circle, surrounds concentrically the first hole 55, with additional bolt circles successively surrounding each previous bolt circle. The number of holes within each respective bolt circle increases at an arithmetic rate with the increase in diameter of the bolt circles. In particular, the first bolt circle comprises six holes, the second bolt circle comprises twelve holes, the third bolt circle comprises eighteen holes, and so forth.

The angle of each of the holes with respect to the central axis of the housing 12 also changes with the increase in diameter of the bolt circles. In particular, the center hole 55 is aligned with the central axis, and is substantially perpendicular to the upstream surface 44 and the downstream surface 46. As illustrated in FIGS. 3 and 4, each individual hole of the successive bolt circles are disposed at an angle $\theta$ that ranges from 0° to 20°. Accordingly, the individual holes of the outermost bolt circle are disposed at the maximum angle $\theta$ with respect to the central axis.

The bolt circle pattern is conducive to known machining techniques. During manufacture, the holes may be drilled with a substantially stationary drill tool with the work piece rotated to each of the positions at which a hole is required within a particular bolt circle. The angle of the drill bit can be increased incrementally as the bolt circle diameter increases. Alternatively, the work piece may be kept stationary while the drill tool is rotated between the various positions.

Electron transmission through the support grid 40 and vacuum barrier 48 is substantially improved over the prior art, since the hole angles are matched to the diverging trajectories of the individual electrons. This enables the diameter of the individual holes to be kept small, leaving a relatively large web area 58 between adjacent ones of the holes for conduction of heat. For a device operating at −160 kilovolts, approximately 20% of the electron beam energy is dissipated into the foil, which is then converted to heat. This heat, along with heat caused by the electrons intercepting the support grid 40, is ultimately removed from the system through the coolant channel 52.

Figure 5A:
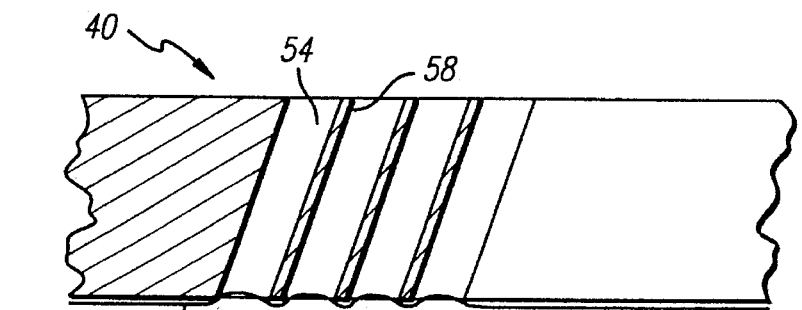
FIGS. 5A and 5B are enlarged cross-sectional side views of the support grid illustrating wrinkling of the vacuum barrier resulting from the bake-out.
Figure 5B:
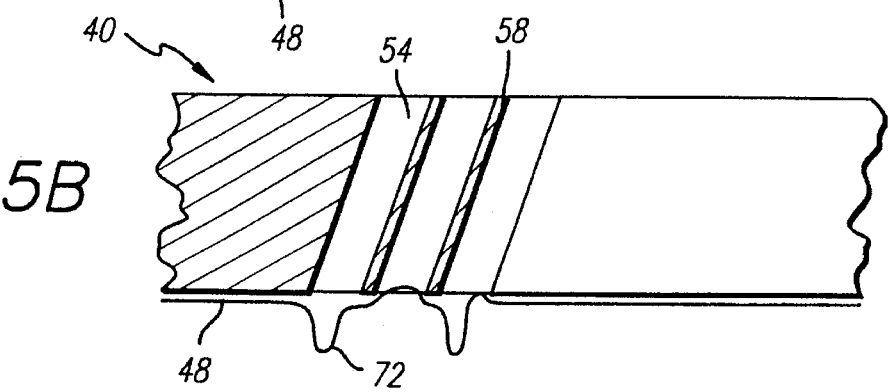

During assembly of the electron beam source 10, support grid 40, and vacuum barrier 48, the entire device is elevated in temperature to eliminate extraneous gases and improve material bonding, known as a "bake-out." At these high temperatures, the materials of the support grid 40 tend to expand at a faster rate than the metal foil of the barrier 48. The uneven thermal expansion causes the barrier 48 to stretch in certain places, resulting in undesired wrinkling of the barrier after the device has cooled to an ambient temperature. FIG. 5A illustrates a portion of the support grid 40 prior to bake-out, with the barrier 48 being drawn slightly inward into the holes 54 of the window due to the vacuum within the electron beam chamber. FIG. 5B illustrates the same portion of the support grid 40 after bake-out, with wrinkles 72 formed adjacent to individual ones of the holes 54. A wrinkle located over a hole, such as wrinkle 72 of FIG. 5B, effectively increases the thermal conduction path length and consequently the $\Delta T$ within the vacuum barrier 48. Accordingly, it is desirable to eliminate these wrinkles.

In the preferred embodiment, the support grid 40 is comprised of a electrically conductive, thermally and structurally rugged material, such as copper. Structural integrity of the support grid 40 sufficient to withstand the vacuum pressure can be further enhanced without compromising thermal conductivity by providing a laminate construction, such as having an internal layer of tungsten-copper for mechanical strength laminated between outer surface layers of copper or copper alloys. Tungsten-copper has a thermal expansion rate close to the titanium material of the vacuum barrier 48, and would inhibit the uneven thermal expansion during bake-out and minimize or eliminate the wrinkling while providing a good thermal conductor.

Stainless steel may also be an acceptable material for the internal layer due to its high mechanical strength and relatively low cost. Since stainless steel has poor thermal conductivity, it would tend to isolate the heat at the upstream surface 44 generated by the electrons intercepting the grid support 40 from the relatively lower level of heat at the downstream surface 46 generated by the electrons transmitting through the foil vacuum barrier 48. If it is desirable to increase the number of holes per bolt circle in order to increase the rate of electron transmission, the grid support 40 may become weakened to an undesirable level. In such case, the thickness of the stainless steel internal layer of the grid support 40 may have to be increased in order to compensate for the reduction in strength.

Figure 6:
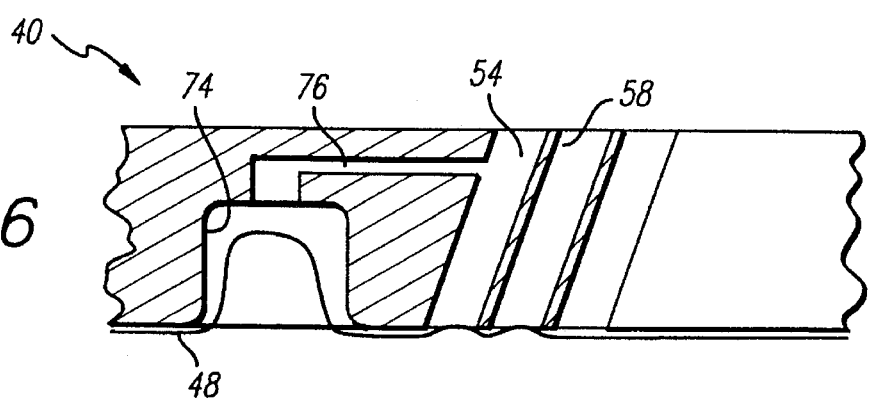
FIG. 6 is an enlarged cross-sectional side view of a support grid as in FIGS. 5A and 5B illustrating a vacuum pressure channel to mitigate wrinkling.

FIG. 6 illustrates a first alternative embodiment of the support grid 40 having a vacuum pressure channel 74 to further reduce wrinkling. The channel 74 is concentrically disposed around the outer periphery of the outermost bolt circle. The channel 74 has a width that is substantially larger than an associated diameter of one of the holes 54. The channel 74 further has a depth that extends a majority of the thickness of the support grid 40, but not entirely therethrough. The channel 74 further includes a vacuum line 76 that couples the channel 74 into the electron beam chamber. Pressure exerted by the vacuum within the electron beam chamber provides an inward force in the channel 74 that is applied on the foil vacuum barrier 48. The substantially greater width of the channel 74 with respect to the holes 54 results in a greater force being applied on the barrier 48 within the channel 74 than at any of the individual holes 54. This inward force draws a portion the barrier 48 inwardly into the channel 74, which pulls any wrinkles out of the barrier.

Figure 7:
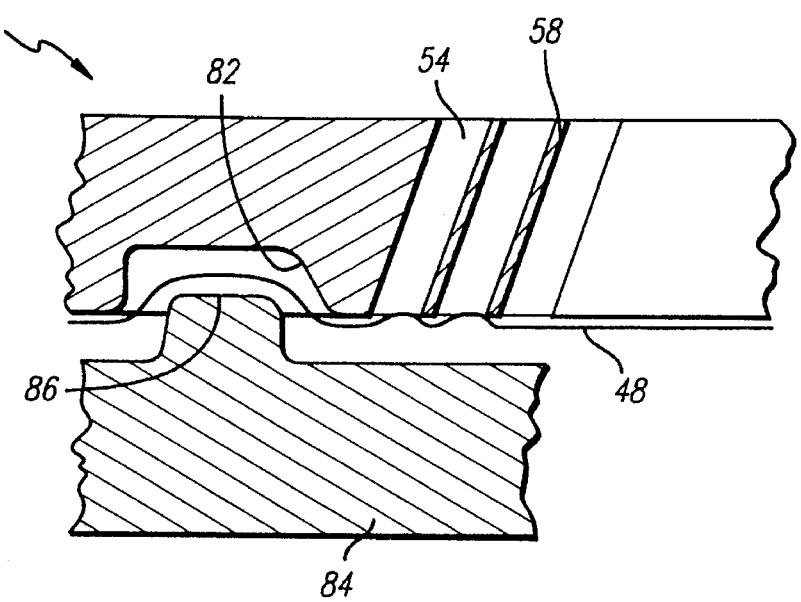
FIG. 7 is an enlarged cross-sectional side view of a support grid as in FIGS. 5A, 5B and 6 illustrating a pressed pressure channel to mitigate wrinkling.

Alternatively, FIG. 7 illustrates another technique for eliminating the wrinkles in the barrier 48. As in the embodiment of FIG. 6, a channel 82 is provided which is concentrically disposed around a peripheral portion of the outermost bolt circle. Unlike the channel 74, the channel 82 is not coupled to a vacuum. Instead, an external tool 84 having a ridge 86 that matches the shape of the channel 82 is utilized to push a portion of the barrier 48 into the channel. The tool 84 is applied in a manner so that the ridge 86 extends inwardly into the channel 82, stretching the barrier 48 to conform to the shape of the channel. Since the metal foil material of the barrier 48 is fairly rigid, it will deform at the channel 82 and remain in the deformed state after the tool 84 has been removed. It would also be possible to provide a ridge 86 that is permanently inserted into the channel 82 to maintain the barrier 48 in the stretched or unwrinkled state.

Having thus described a preferred embodiment of an electron window for a toxic remediation device, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. An electron beam source for use in remediation of hazardous volatile organic compounds, comprising:

means for emitting a diverging electron beam;

a support grid spaced from said emitting means and having a plurality of holes disposed at diverging angles in a bolt circle pattern, individual electrons of said diverging electron beam passing through respective ones of said plurality of holes; and a barrier provided on a downstream side of said support grid, said individual electrons passing through said barrier.

2. The electron beam source of claim 1, wherein said bolt circle pattern further comprises a single one of said holes substantially centered on said support grid, and a plurality of groups of said holes concentrically disposed around said single one of said holes, wherein each of said groups of said holes is disposed in a circular pattern.

3. The electron beam source of claim 2, wherein an associated angle of said holes defined within successive ones of said plurality of groups of holes increases as an associated diameter of said circular patterns increases.

4. The electron beam source of claim 2, wherein a number of said holes defined within successive ones of said plurality of groups of holes increases arithmetically as an associated diameter of said circular patterns increases.

5. The electron beam source of claim 1, wherein each one of said holes are circular and comprise a substantially uniform diameter.

6. The electron beam source of claim 1, further comprising a coolant channel disposed within an outermost peripheral region of said support grid.

7. The electron beam source of claim 1, wherein said barrier is comprised of a metal foil.

8. The electron beam source of claim 1, wherein said barrier is comprised of titanium material.

9. The electron beam source of claim 1, wherein said barrier is comprised of beryllium.

10. The electron beam source of claim 1, further comprising means for eliminating wrinkles formed in said barrier.

11. An electron window for use between a source of a diverging electron beam and a detoxification vessel containing hazardous volatile organic compounds, comprising:

a support grid spaced from said electron beam source and having a plurality of holes disposed at diverging angles in a bolt circle pattern, individual electrons of said diverging electron beam passing through respective ones of said plurality of holes; and a barrier provided on a downstream side of said support grid, said individual electrons passing through said barrier.

12. The electron window of claim 11, wherein said bolt circle pattern further comprises a single one of said holes substantially centered on said support grid, and a plurality of groups of said holes concentrically disposed around said single one of said holes, wherein each of said groups of said holes is disposed in a circular pattern.

13. The electron window of claim 12, wherein an associated angle of said holes defined within successive ones of said plurality of groups of holes increases as an associated diameter of said circular patterns increases.

14. The electron window of claim 12, wherein a number of said holes defined within successive ones of said plurality of groups of holes increases arithmetically as an associated diameter of said circular patterns increases.

15. The electron window of claim 11, wherein said support grid is comprised of a laminate structure having an inner layer selected from a group consisting of copper, copper-tungsten and stainless steel.

16. The electron window of claim 15, wherein said laminate structure further includes outer layers comprised of copper.

17. The electron window of claim 11, wherein said barrier is comprised of a metal foil.

18. The electron window of claim 11, wherein said barrier is comprised of titanium material.

19. The electron window of claim 11, further comprising a coolant channel disposed within an outermost peripheral region of said support grid.

20. The electron window of claim 11, wherein said holes are circular and have a substantially uniform diameter.

* * * * *